US012202251B2

(12) United States Patent
Murzynowski et al.

(10) Patent No.: US 12,202,251 B2
(45) Date of Patent: Jan. 21, 2025

(54) DRYER MANAGEMENT SYSTEM AND METHOD OF DRYING A MATERIAL DEPOSITED ON A WEB

(71) Applicant: Cryovac, LLC, Charlotte, NC (US)

(72) Inventors: Alan Ronald Murzynowski, Grand Island, NY (US); Theodore F. Cyman, Grand Island, NY (US); Daniel Edward Kanfoush, Grand Island, NY (US); Anthony Vincent Moscato, N. Tonawanda, NY (US); Brett Christopher Rimes, Grand Island, NY (US)

(73) Assignee: Cryovac, LLC, Charlotte, NC (US)

( * ) Notice: Subject to any disclaimer, the term of this patent is extended or adjusted under 35 U.S.C. 154(b) by 246 days.

(21) Appl. No.: 17/910,450

(22) PCT Filed: Mar. 11, 2021

(86) PCT No.: PCT/US2021/021859

§ 371 (c)(1),
(2) Date: Sep. 9, 2022

(87) PCT Pub. No.: WO2021/183738

PCT Pub. Date: Sep. 16, 2021

(65) Prior Publication Data

US 2023/0127632 A1 Apr. 27, 2023

Related U.S. Application Data

(60) Provisional application No. 62/988,504, filed on Mar. 12, 2020.

(51) Int. Cl.
*B41J 11/00* (2006.01)
*B41J 2/375* (2006.01)

(52) U.S. Cl.
CPC ......... *B41J 11/00222* (2021.01); *B41J 2/375* (2013.01); *B41J 2203/01* (2020.08)

(58) Field of Classification Search
CPC .. B41J 11/00222; B41J 2/375; B41J 2203/01; B41J 15/04
See application file for complete search history.

(56) References Cited

U.S. PATENT DOCUMENTS 8,777,396 B2 7/2014 Mizes et al.
8,777,399 B2 7/2014 Mo et al.
(Continued)

FOREIGN PATENT DOCUMENTS

CN 204123779 1/2015
CN 107160851 9/2017
(Continued)

*Primary Examiner* — Bradley W Thies
(74) *Attorney, Agent, or Firm* — Jason R. Womer

(57) ABSTRACT

A dryer management system includes a global dryer control system and a closed loop dynamic dryer control system to manage drying of a material deposited on web. The global dryer control system analyzes information regarding a production run to determine a web conveyance speed and a maximum web temperature. The closed loop dynamic dryer control system monitors an indication of a temperature of the web to maintain the indication of the temperature below the maximum web temperature. The closed loop dynamic dryer control system also analyzes images of the web to determine if the material is being insufficiently dried.

19 Claims, 9 Drawing Sheets

(56) References Cited

U.S. PATENT DOCUMENTS

| | | | |
|---|---|---|---|
| 9,073,357 B1 | 7/2015 | Condello et al. | |
| 9,180,705 B1 | 11/2015 | Regelsberger et al. | |
| 9,376,582 B1 | 6/2016 | Dannhauser et al. | |
| 9,434,201 B2 | 9/2016 | Dannhauser et al. | |
| 2005/0025880 A1 | 2/2005 | Masuda | |
| 2010/0046014 A1 | 2/2010 | Eun et al. | |
| 2012/0162299 A1 | 6/2012 | Chappell | |
| 2019/0171135 A1* | 6/2019 | Ota | G03G 15/205 |
| 2019/0283459 A1 | 9/2019 | Nakamura et al. | |

FOREIGN PATENT DOCUMENTS

| | | | |
|---|---|---|---|
| CN | 108362111 | 8/2018 | |
| CN | 208946892 | 6/2019 | |
| JP | S6295285 | 5/1987 | |
| WO | 2006083903 | 8/2006 | |
| WO | WO-2019212494 A1 * | 11/2019 | B41F 23/04 |

* cited by examiner

DRYER MANAGEMENT SYSTEM AND METHOD OF DRYING A MATERIAL DEPOSITED ON A WEB

CROSS-REFERENCE TO RELATED APPLICATIONS

This application claims priority to U.S. Provisional Patent Application Ser. No. 62/988,504, filed Mar. 12, 2020 and entitled "Dryer Management System and Method of Drying A Material Deposited on A Web," the entirety of which is incorporated herein by reference.

BACKGROUND

The present subject matter relates to dryer management systems and methods, and more particularly, to a system and method of drying a material deposited on a web.

High speed printing systems have been developed for printing on a substrate, such as a web of shrinkable polymeric film. Such a material typically exhibits both elasticity and plasticity characteristics that depend upon one or more applied influences, such as force, heat, chemicals, electromagnetic radiation, etc. These characteristics must be carefully taken into account during the system design process because it may be necessary: 1.) to control material shrinkage during imaging so that the resulting imaged film may be subsequently used in a shrink-wrap process, and 2.) to avoid system control problems by minimizing dynamic interactions between system components due to the elastic deformability of the substrate.

Also, a flexible web is subject to the formation of wrinkles therein, resulting in poor or even unacceptable print quality. A further issue is encountered in a print system using ink jet printheads to apply inks to a flexible web. A splice or wrinkle passing an ink jet printer during high speed production can damage one or more of the printheads of the printer, resulting in expensive downtime and the need to replace the damaged printheads, entailing significant replacement costs.

The discussion above is merely provided for general background information and is not intended to be used as an aid in determining the scope of the claimed subject matter.

BRIEF DESCRIPTION

According to one aspect, a dryer management system to manage drying a material deposited on a web includes a web transport adapted to convey the web, a dryer unit or series of dryer units associated with and disposed downstream of an imager unit having at least heater unit adapted to generate a flow of heated air to heat the web, a temperature sensing device is disposed proximate the web to develop an indication of a temperature of the web as the web is conveyed past the heater unit; and a closed-loop dryer controller. The closed-loop dryer controller monitors the indication of the temperature and adjusts operation of the heater unit to maintain the indication of the temperature of the web below a maximum temperature.

According to another aspect, a method of managing drying of a material deposited on a web includes the steps of conveying the web having an undried material deposited thereon, generating a flow of heated air to heat the web, developing an indication of a temperature of the web, and monitoring the indication of the temperature. In addition, the method includes the further step of, in response to monitoring the indication of the temperature, adjusting at least one of a second temperature of the heated air and a speed of the heated air to maintain the first temperature of the web below a maximum temperature.

Other aspects and advantages will become apparent upon consideration of the following detailed description and the attached drawings wherein like numerals designate like structures throughout the specification.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
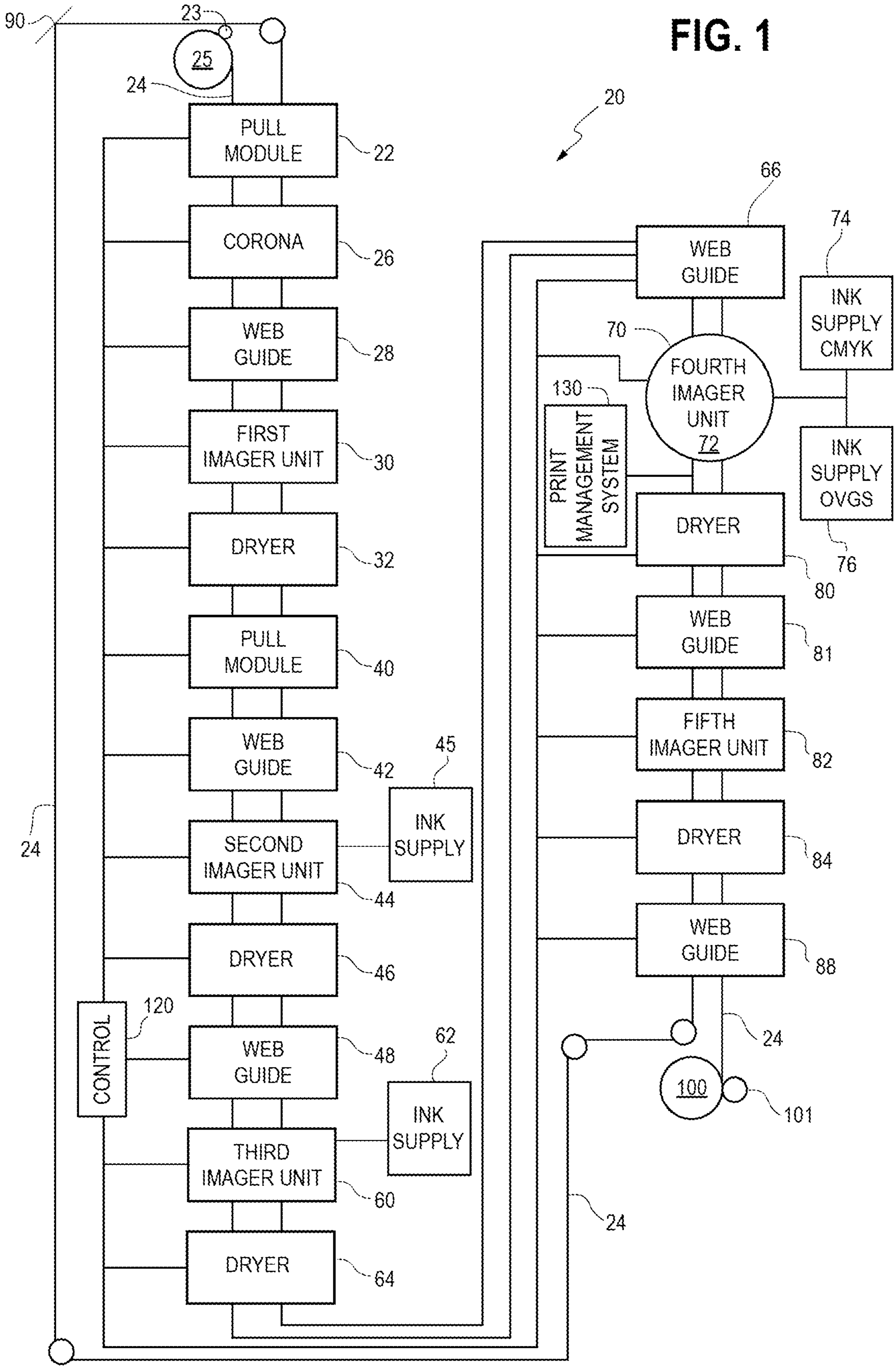
FIG. 1 is a simplified block diagram of an exemplary system for printing images and/or text on a substrate.

FIG. 1 shows an exemplary system 20 for printing content (e.g., images and/or text) on a substrate, such as a shrinkable plastic film used in food grade applications. It should be understood, however, that the system 20 may be used to print on any polymer or other flexible material that is dimensionally stable or unstable during processing for any application, e.g., other than food grade. The system 20 preferably operates at high-speed, e.g., on the order of zero to about 500 or more feet per minute (fpm) and even up to about 1000 fpm, although the system may be operable at a different speed, as necessary or desirable. The illustrated system 20 is capable of printing images and/or text on both sides of a substrate (i.e., the system 20 is capable of duplex printing) although this need not be the case. In the illustrated embodiment, a first side of a substrate is imaged by a sequence of particular units during a first pass, the substrate is then turned over and the other side of the substrate is imaged by all of the particular units or only by a subset of the particular units during a second pass. First portions of one or more of the particular units may be operable during the first pass and second portions of one or more of the particular units laterally offset from the first portions may be operable during the second pass. Also, one or more of the particular units may be capable of simultaneously treating and/or imaging both sides of the substrate during one pass, in which case such unit(s) need not be operable during the other pass of the substrate. In the illustrated embodiment, the first portions are equal in lateral extent to the second portions, although this is not necessarily the case. Thus, for example, the system may have a 52 inch width, and may be capable of duplex printing up to a 26 inch wide substrate. Alternatively, a 52 inch wide (or smaller) substrate may be printed on a single side (i.e., simplex printed) during a single production run. If desired, additional imager units and associated dryer and web guide units may be added in line with the disclosed imager units and other units so as to obtain full-width (i.e., 52 inch in the disclosed embodiment) duplex printing capability. Still further, a substrate having a different width, such as 64 inches (or larger or smaller width) may be accommodated.

Further, the illustrated system 20 may comprise a fully digital system that solely utilizes ink jet printers, although other printing methodologies may be utilized to image one or more layers, such as flexographic printing, lithographic offset printing, silk screen printing, intaglio printing, letter-press printing, etc. Ink jet technology offers drop on demand capability, and thus, among other advantages, allows high levels of color control and image customization.

In addition to the foregoing, certain ink jet heads are suitable to apply the high opacity base ink(s) that may be necessary so that other inks printed thereon can receive enough reflected white light (for example) so that the overprinted inks can adequately perform their filtering function. Some printhead technologies are more suitable for flood coating printing, like printing overcoat varnish, primers, and white, and metallic inks.

On the other hand, printing high fidelity images with high resolution printheads achieves the best quality. Using drum technology and printing with ink jet is the preferred way to maintain registration, control a flexible/shrinkable film substrate, and reproduce an extended gamut color pallet.

The system disclosed herein has the capability to print an extended gamut image. In some cases the color reproduction required may need a custom spot color to match the color exactly. In these cases, an extra eighth channel (and additional channels, if required) can be used to print custom color(s) in synchronization with the other processes in the system.

Printing on flexible/shrinkable films with water-based inks has many challenges and require fluid management, temperature control, and closed loop processes. Thus, in the present system, for example, the ability to maintain a high quality color gamut at high speed is further process controlled by sensor(s) that may comprise one or more calibration cameras to fine tune the system continually over the length of large runs.

As used herein, the phrase "heat-shrinkable" is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2X, at least 3X, at least 4X, at least 5X, at least 6X, at least 7X, at least 8X, at least 9X, at least 10X, at least 16X, or from 1.5X to 20X, from 2X to 16X, from 3X to 12X, or from 4X to 9X.

Figure 2:
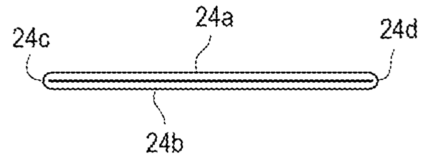
FIG. 2 is an end elevational view of a polymeric film to be imaged by the system of FIG. 1.

As shown in FIG. 1, the illustrated system 20 includes a first pull module 22 that unwinds a web of plastic web 24 from a roll 25 that is engaged by a nip roller 23 at the beginning of a first printing pass through the system 20. The web 24 may comprise a flattened cylinder or tube of plastic film comprising two layers having sides 24*a*, 24*b* (see FIG. 2) joined at side folds 24*c*, 24*d*, although the web 24 may instead simply comprise a single layer of material, if desired and as referred to above. Once unwound by the module 22, the web 24 may be processed by a surface energy modification system, such as a corona treatment unit 26 of conventional type, that increases the surface energy of the web 24. The corona treatment addresses an imaging condition that may be encountered when a large number of closely spaced drops are applied to a low surface energy impermeable material, which, if not compensated for, can result in positional distortion of the applied inks due to coalescence effects. The corona treatment module may be capable of treating both sides of the web 24 simultaneously. A first web guide 28 of conventional type that controls the lateral position of the web 24 in a closed-loop manner then guides the corona-treated web 24 a first imager unit 30. A first dryer unit 32 is operated to dry the material that is applied to the web 24 by the first imager unit 30. The material applied by the first imager unit 30 may be deposited over the entirety of the web 24 or may be selectively applied only to some or all areas that will later receive ink.

A second pull module 40 and a second web guide 42 (wherein the latter may be identical to the first web guide 28) deliver the web 24 to a second imager unit 44 that prints a material supplied by a first supply unit 45 on the web 24. A second dryer unit 46 is operable to dry the material applied by the second imager unit 44.

Thereafter, the web 24 is guided by a third web guide 48 (again, which may be identical to the first web guide 28) to a third imager unit 60 that applies material supplied by a second supply unit 62 thereon, such as at a location at least partially covering the material that was deposited by the second imager unit 44. A third dryer unit 64 is operable to dry the material applied by the third imager unit 60 and the web 24 is then guided by a fourth web guide 66 (that also may be identical to the first web guide 28) to a fourth imager unit 70 comprising a relatively high resolution, extended color gamut imager unit 70.

The imager unit 70 includes a drum 72 around which are arranged ink jet printheads for applying primary process color inks CMYK to the web 24 along with secondary process color inks orange, violet, and green OVG and an optional spot color ink S to the web 24 at a relatively high resolution, such as 1200 dpi and at a high speed (e.g., 100-500 fpm). The extended gamut printing is calibrated at the high printing speed. The drop sizes thus applied are relatively small (on the order of 3-6 pL). If desired, the imager unit 70 may operate at a different resolution and/or apply different drop sizes. The inks are supplied by third and fourth supply units 74, 76, respectively, and, in some embodiments, the inks are of the water-based type. The process colors comprising the CMYK and OVG inks enable reproduction of extended gamut detailed images and high quality graphics on the web 24. A fourth dryer unit 80 is disposed downstream of the fourth imager unit 70 and dries the inks applied thereby.

Following imaging, the web 24 may be guided by a web guide 81 (preferably identical to the first web guide 28) and coated by a fifth imager unit 82 comprising an ink jet printer operating at a relatively low resolution and large drop size (e.g., 600 dpi, 5-12 pL size drops) to apply an overcoat, such as varnish, to the imaged portions of the web 24. The overcoat is dried by a fifth dryer unit 84. Thereafter, the web is guided by a web guide 88 (also preferably identical to the first web guide 28), turned over by a web turn bar 90, which may comprise a known air bar, and returned to the first pull module 22 to initiate a second pass through the system 20, following which material deposition/imaging on the second side of the web 24 may be undertaken, for example, as described above. The fully imaged web 24 is then stored on a take-up roll 100 engaged by a nip roll 101 and thereafter may be further processed, for example, to create shrink-wrap bags.

While the web 24 is shown in FIG. 1 as being returned to first the pull module 22 at the initiation of the second pass, it may be noted that the web may be instead delivered to another point in the system 20, such as the web guide 28, the first imager unit 30, the pull module 40, the web guide 42, or the imager unit 44 (e.g., when the web 24 is not to be pre-coated), bypassing front end units and/or modules, such as the module 22 and the corona treatment unit 26.

Further, in the case that the web 24 is to be simplex printed (i.e., on only one side) the printed web 24 may be stored on the take-up roll 100 immediately following the first pass through the system 20, thereby omitting the second pass entirely.

The web 24 may be multilayer and may have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils. The web 24 may have a film percent transparency (also referred to herein as film clarity) measured in accordance with ASTM D 1746-97 “Standard Test Method for Transparency of Plastic Sheeting”, published April, 1998, which is hereby incorporated, in its entirety, of at least 15 percent, or at least 20 percent, or at least 25 percent, or at least 30 percent.

Preferably, the system 20 includes a first tension zone between the roll 25 (which is a driven roll) and the pull module 22, a second tension zone between the pull module 22 and the imager unit 30, a third tension unit between the imager unit 30 and the pull module 40, a fourth tension zone between the pull module 40 and the imager unit 44, a fifth tension zone between the imager unit 44 and the imager unit 60, a sixth tension zone between the imager unit 60 and the drum 72, a seventh tension zone between the drum 72 and the imager unit 82, and an eighth tension zone between the imager unit 82 and the take-up roll 100 (which is a driven roll). One or more tension zones may be disposed between the imager unit 82 and the pull module 22 and/or at other points in the system 20. Each of the elements defining the ends of the tension zones comprises, for example, a driven roll (which, in the case of the imager units 30, 44 60, 70, and 82, comprise imager drums) with a nip roller as described in greater detail hereinafter. Preferably, all of the tension zones are limited to about 20 feet or less in length. The web tension in each tension zone is controlled by one or more tension controllers such that the web tension does not fall outside of predetermined range(s).

The nature and design of the first, second, and third imager units 30, may vary with the printing methodologies that are to be used in the system 20. For example, in a particular embodiment in which a combination of flexographic and ink jet reproduction is used, then the first imager unit 30 may apply a composition comprising a clear primer and a dispersion of a white colorant, such as titanium dioxide, in a flood-coated fashion to the web 24. The second imager unit 44, which may comprise an ink jet printer or a flexographic unit, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a further embodiment, the first imager unit 30 comprises a flexographic unit that applies a white pigmented ink to the web 24, the second imager unit 44 comprises an ink jet printer or a flexographic unit that applies one or more metallic inks, and the third imager unit 60 comprises an ink jet printer or flexographic unit that applies a clear primer to the web 24.

In yet another embodiment that uses ink jet technology throughout the system 20, the first imager unit 30 comprising an ink jet printer may apply a composition comprising a clear primer and a dispersion of a white colorant, such as titanium dioxide, to the web 24. The second imager unit 44, which comprises an ink jet printer, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a still further embodiment, the first imager unit 30 comprises an ink jet printer that applies a white pigmented ink to the web 24, the second imager unit 44 comprises an ink jet printer that applies one or more metallic inks, and the third imager unit 60 comprises an ink jet printer that applies a clear primer to the web 24.

Any one or more of the imager units 30, 44, 60, 70, and 82 may be omitted or the functionality thereof may be combined with one or more other imager units. Thus, for example, in the case where a combined primer and white pigmented material are applied, the combination may be printed by one of the imager units 30 or 44 and the other of the imager units 30, 44 may be omitted.

In some embodiments each of the first, second, and third imager units 30, 44, 60 comprises a 600 dpi (dots per inch) inkjet printer that applies relatively large drops (i.e., at least 5-12 picoliters (pL)) each using piezoelectric ink jet heads, although the imager units 30, 44, and/or 60 may operate at a different resolution and/or apply different sizes of drops. Thus, for example, a printhead designed for use with metallic and precoating inks in the present system may have a resolution of 400 dpi and drop volume of 20-30 pL. The pre-coating material, white, and metallic inks have relatively heavy pigment loading and/or large particle sizes that are best applied by the relatively low resolution/large drop size heads of the imager units 30, 44, 60.

In alternative embodiments, one or more of the primer, white, and coating imager units may operate at a relatively high resolution and/or small drop size, such as 1200 dpi/3-6 pL.

The primer renders at least a portion of the surface of the web 24 suitable to receive later-applied water-based inks. It is preferable (although not necessary) to apply the primer just before the process and spot color inks are applied by the fourth imager unit 70 so that the such colors are directly applied to the dried primer.

Preferably, the fourth imager unit 70 comprises the above-described ink jet printer so that drop-on-demand technology may be taken advantage of, particularly with respect to print-to-print variability, high resolution, and the ability to control registration precisely.

The fifth imager unit 82 also preferably comprises an ink jet printer that operates at least at 1200 dpi or 2400 dpi, although it may instead be implemented by a different printing methodology, such as a flexographic unit.

As noted in greater detail hereinafter, a supervisory or global control system 120 is responsive to sensors (not shown in FIG. 1) and is responsible for overall closed-loop control of various system devices during a production run. A further control system comprising a print management control system 130 controls the various imager units also in a closed-loop fashion to control image reproduction as well as color correction, registration, correct for missing pixels, etc.

Also in the illustrated embodiment, each dryer unit 32, 46, 64, 80, and 84 is controlled by an associated closed-loop dryer management system (not shown in FIG. 1) during printing to, among other things, minimize image offsetting (sometimes referred to as "pick-off"), which can result in artifacts that may result from improper or insufficient drying of ink deposited on the web causing undried ink/coating to adhere (i.e., offset) to one or more system handling components, such as idler roller(s) or other component(s), and be transferred from such system handling component(s) to other portions of the web. It is understood that each dryer unit can be a like kind of dryer unit or distinct types of dryer units.

In the case of a partially or completely ink jet implemented system, the printheads used by the first through fifth imager units 30, 44, 60, 70, and/or 82 may be of the same or different types, even within each printer, and/or, as noted previously, different printing methodologies could be used to apply inks/coatings. In any event, the global control system 120 and/or the print management control system 130 is (are) programmed to convert input data representing the various layers, such as data in a print-ready source format (e.g., Adobe Portable Document Format or PDF) to bitmaps by a ripping process or other page representation(s) during pre-processing taking into account the operational characteristics of the various printhead types/printing methodologies (such as the resolution(s) and drop size(s) to be deposited) and properties of the web (such as shrinkage when exposed to heat).

Figure 3:
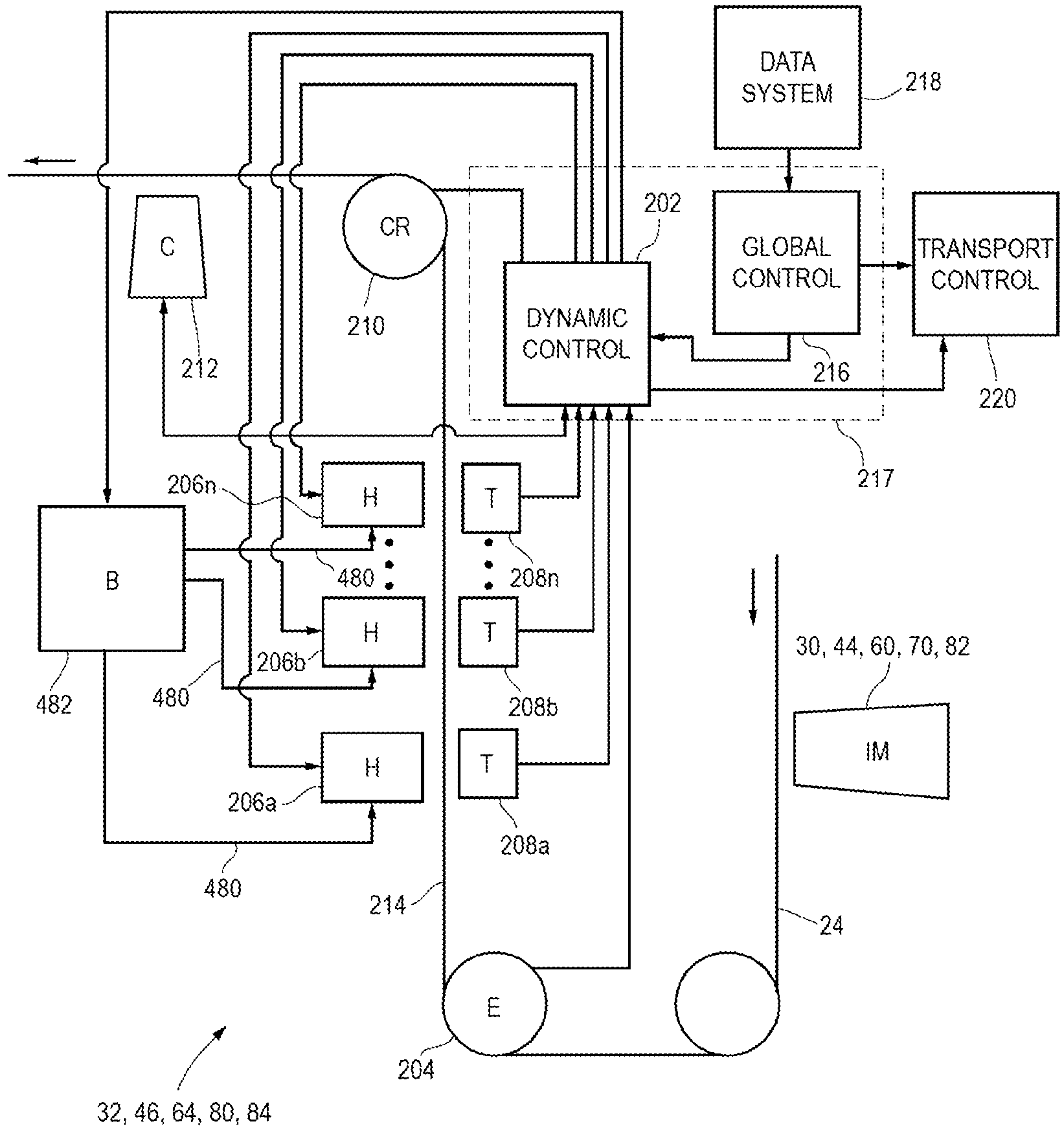
FIG. 3 is a simplified block diagram of a dryer unit of the system of FIG. 1.

The pull module 22, the web guides 42, 48, 66, and 81, and the rollers described above provide a web transport that conveys the web 24 past the imager units 44, 60, 70, and 82. Referring to FIG. 3, each dryer unit 32, 46, 64, 80, and 84 associated with an imager unit 30, 44, 60, 70, and 82, respectively, comprises a closed-loop dryer controller 202, an encoder roller 204, one or more heater unit(s) 206*a*-206*n*, one or more temperature sensing devices 208*a*-208*n*, a roller 210, and a camera 212.

After the web 24 is printed on by the imager unit 30, 44, 60, 70, or 82, as described above, the web 24 is conveyed past the encoder roller 204 that generates a plurality of signals, one such signal for each revolution undertaken thereby. The imager unit 70 includes a plurality of printheads 228*a*-228*h* that, for example, deposit process and/or spot color inks onto the web 24.

Each heater unit 206*a*-206*n* is associated with a temperature sensing device 208*a*-208*n*, respectively, and the heater unit(s) 206*a*-206*n* and the temperature sensing device 208*a*-208*n* are disposed such that the web 24 is conveyed therebetween. Further, each heater unit 206 generates a flow of heated air that is blown toward a side 214 of the web 24 having material deposited thereon by the imager unit 30, 44, 62, or 68. In a preferred embodiment, the direction of the flow of heated air is perpendicular to the side 214 of the web 24. However, the flow of heated air may be directed toward the web at other angles or even transverse to the web to heat the web.

The closed-loop dryer controller 202 monitors the drying of the material on the web 24 and an indication of a temperature of the web 24 developed by the temperature sensing device 208 to ensure that the material is sufficiently dried and that the temperature of the web 24 does not become so great as to damage the web (e.g., cause the web to shrink.)

All of closed-loop dryer controllers 202 of the system 20 are configured prior to a production run by a global dryer control system 216 in accordance with parameters of the production run. The global dryer control system 216 and the closed-loop dryer controller 202 comprise the closed-loop dryer management system 217 noted above.

After the web 24 passes between the heater unit(s) 206*a*-206*n* and the temperature sensing device(s) 208, the web is conveyed past the roller 210 and the camera 212. The roller 210 is the first roller (or any other component of the dryer unit 32, 46, 64, 80, 84) that contacts the side 214 of the web 24, and thus any material deposited on such side 214. The roller 210 may be an idler roller that supports the web 24, a chiller roller that facilitates cooling of the web, or any other type of roller or component that first contacts the side 214 after the web 24 has been conveyed past the heater unit(s) 206*a*-206*n*. The camera 212 is positioned to capture one or more image(s) of the side 214 as the web 24 is conveyed thereby.

At the beginning of a production run (or print job), the global dryer control system 216 receives information regarding the production run from a data system 218 and configures the closed-loop dryer controller 202 with a minimum temperature the web 24 must reach to dry material deposited thereon by the imager unit 30, 44, 60, 70, or 82 associated with the dryer unit 32, 46, 64, 80, or 84, respectively, and a maximum temperature that a temperature of the web cannot exceed to ensure the web does not undergo undesired shrinking or other damage. The global dryer control system 216 also determines a maximum speed at which the web 24 may be conveyed to ensure that the web 24 has sufficient heater dwell time (i.e., exposure to the flow(s) of heated air generated by heater unit(s) 206*a*-206*n*) to dry the deposited material and configures a transport control 220 to set the conveyance speed of the web 24.

Figure 3A:
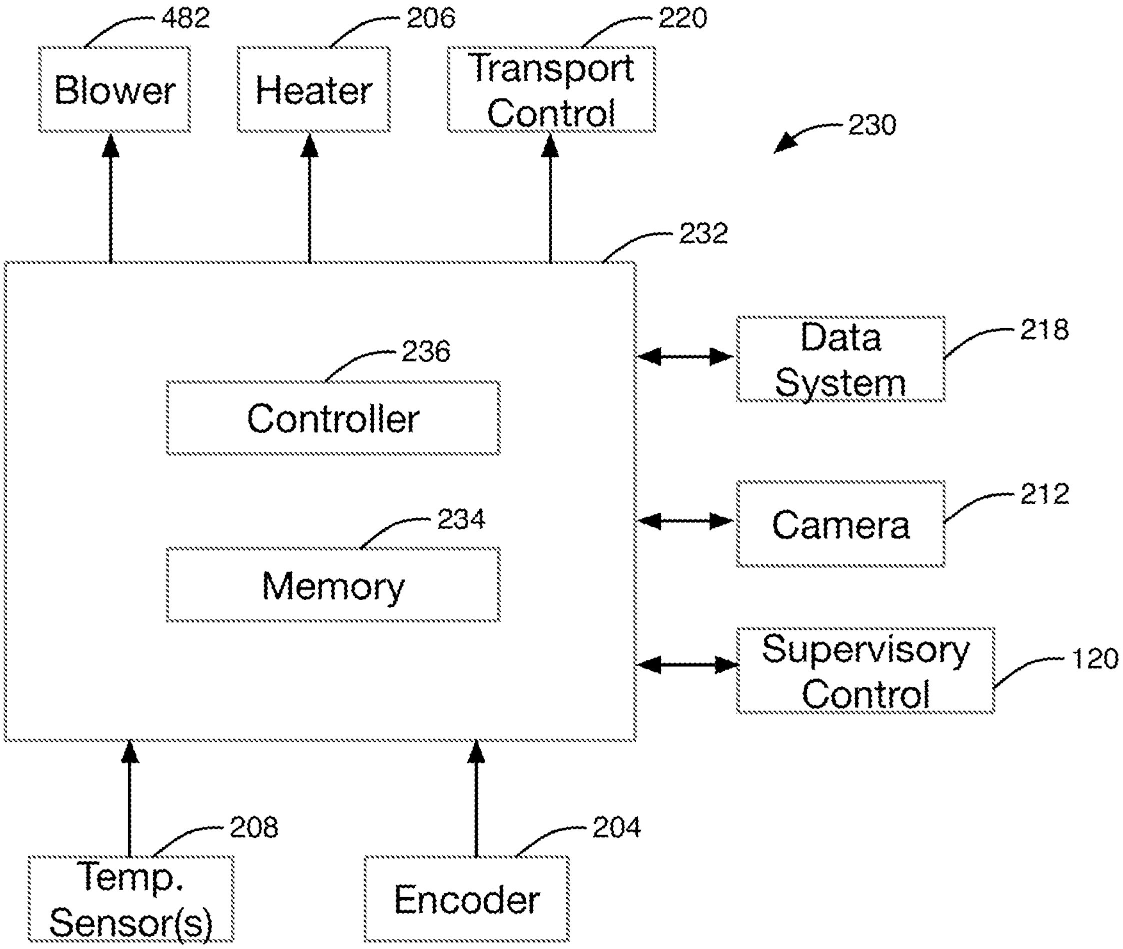
FIG. 3A is a block diagram of a computer system for implementing a closed-loop dryer management system of FIG. 3.

FIG. 3A illustrates a computer system 230 especially adapted to implement the closed-loop dryer management system 217, it being understood that any or all of the control systems disclosed herein, such as one or more of the control systems 120, 130, 218, and/or 220, may be implemented by like computer systems or by the computer system 230. Thus, for example, the computer system 230 may also comprise one or more processing unit(s) 232 and may implement the closed-loop dryer management system 217. Each processing unit 232 comprises a personal computer, server, or other programmable device having a memory 234 that, among other things, stores programming executed by one or more processing module(s) or controller(s) 236 to implement the closed-loop dryer management system 217. One or more of the processing unit(s) 232 receive(s) signals from the temperature sensing device(s) 208 and other sensors, receive(s) signals from the web position encoder 204, controls operation of heater units 206 and/or a blower 482 of the dryer units 32, 46, 64, 80, or 84 and the camera 212, and communicates with the supervisory control 120, the data system 218, and transport control 220.

Figure 4:
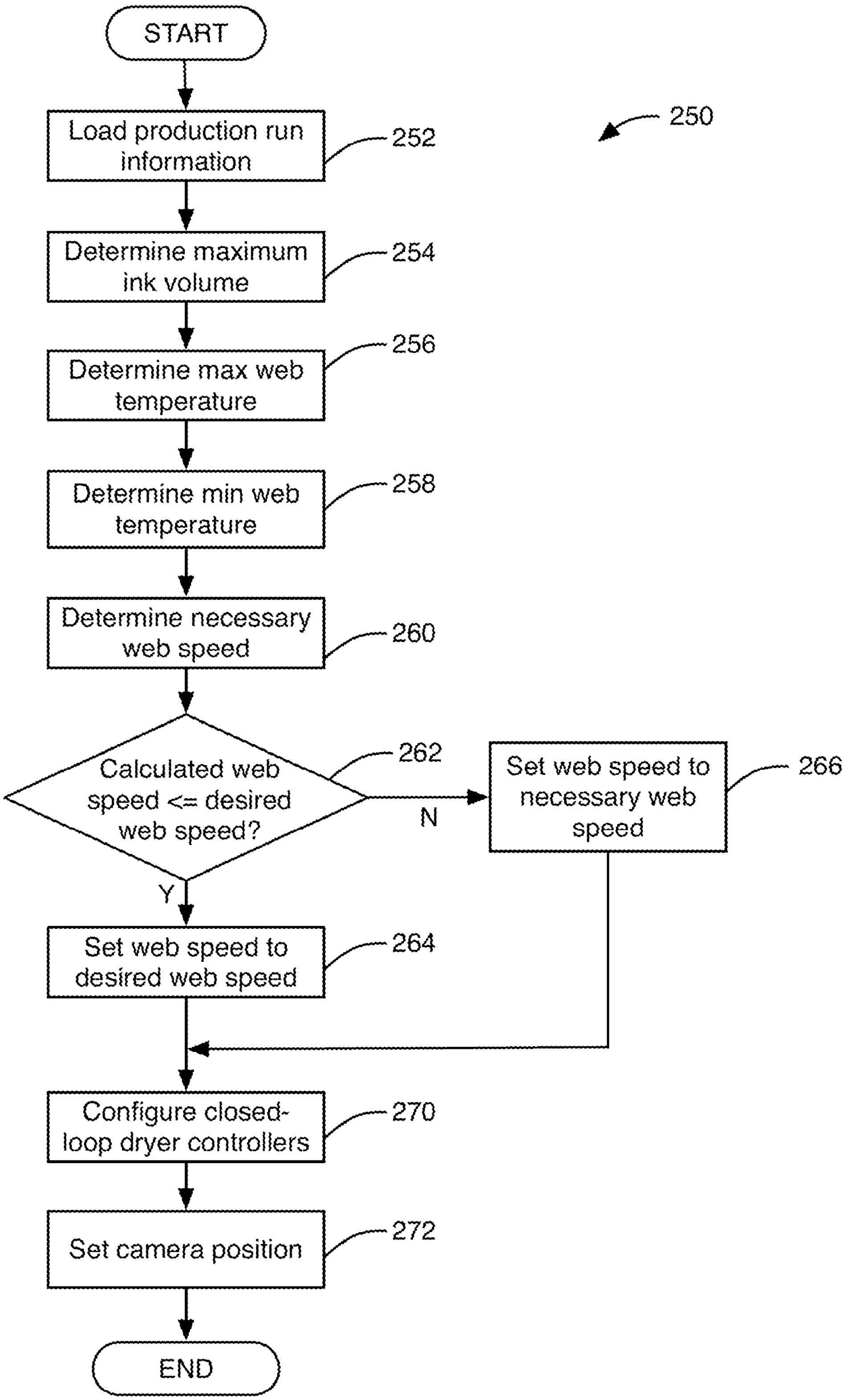
FIG. 4 is a flowchart of steps undertaken by a global dryer control system of the system of FIG. 1 to configure operating parameters of the dryer unit of FIG. 9.

FIG. 4 is a flowchart 250, of the steps undertaken by the global dryer control system 216 to configure the closed-loop dryer controller 202 and the transport control 220. Specifically, at step 252, the global dryer control system 216 receives, from the data system 218, information regarding the production run including, for example, characteristics of the substrate that comprises the web 24, a desired web conveyance speed, characteristics of the material deposited by each imager unit 30, 44, 62, and 68, resolution and drop sizes each imager unit 30, 44, 62, and 68 is to deposit, and the content to be printed.

At step 254, the global dryer control system 216 analyzes the content to be printed, the resolution to be printed by each imager unit 30, 44, 62, and 68, and the drop sizes that such imager units are configured to deposit to develop an estimate of a maximum material volume on any portion of the web 24 that is to be deposited by any of the imager units 30, 44, 62, and 68. Such maximum material volume may be represented as a dot-percent of material, a volume of material per area of the web, or another metric apparent to one who has ordinary skill in the art.

In some embodiments, the maximum material volume per area of the web 24 is calculated by another system (not shown) when the content is prepared for printing and stored in the data system 218. In such embodiments, the global dryer control system 216 receives the maximum material volume per area from the data system, at step 254.

At step 256, the global dryer control system 216 determines, based on the characteristics of the substrate that comprises the web 24, a maximum temperature such substrate may reach without being damaged. In some embodiments, the data system 218 includes such maximum temperature information for each type of substrate and the global dryer control system 216 retrieves such information.

In a preferred embodiment, the maximum web temperature determined at step 256 is less than a temperature that would cause shrinkage or other harm to the web 24. For example, if a particular substrate that comprises the web 24 begins to shrink at a temperature of 130° F. (about 54° C.), the maximum web temperature may be set to 125° F. (about 52° C.).

Referring once again to FIG. 4, at step 258, the global dryer control system 216 determines the minimum web temperature the web 24 will have to reach in order to sufficiently dry the maximum material volume per area determined at step 254. In some embodiments, the data system 218 includes information, for each type of material, the temperature a particular volume of such material must reach to be dried. In such embodiments, the global dryer control system 216 uses such material information and maximum material volume per area to determine the minimum web temperature the web will have to reach.

In a preferred embodiment, the minimum web temperature determined at step 258 is greater than the temperature at which the maximum volume of material per area that is to be deposited during the production run would dry completely. For example, if the maximum volume of material per area to be deposited for the production run would dry completely at a temperature of 115° F., the minimum web temperature may be set to 120° F.

In other embodiments, the global dryer control system 216 may calculate the minimum web temperature in accordance with the maximum web temperature determined at step 256 by, for example, multiplying the maximum web by a predetermined value greater than zero and less than 1. In some embodiments, such predetermined value between is about 0.90 to about 0.98. In other embodiments, such predetermined value is between about 0.85 and about 0.98, and still other embodiments, such predetermined value is between about 0.95 and about 0.97.

In some embodiments, the global dryer control system 216 calculates one minimum web temperature in accordance with the maximum volume of material per area that is deposited by all of the imager units 30, 44, 60, 70, and 82. In other embodiments, the global dryer control system 216 calculates a minimum web temperature for each dryer unit 32, 46, 64, 80, or 84 in accordance with a maximum volume of material per area that is expected to be deposited by the imager unit 30, 44, 60, 70, or 82, respectively, associated with such heater unit 206.

At step 260, the global dryer control system 216 calculates a necessary web speed that will provide sufficient heater dwell time for the web to reach the minimum web temperature estimated at step 258. In some embodiments, the data system 218 provides information regarding the dwell time and temperature necessary for the material on the web 24 to sufficiently dry and the data system 218 or global dryer control system 216 determines the necessary web speed to provide such dwell time based on the material comprising the web 24 and the heating characteristics of the heater units 206.

At step 262, the global dryer control system 216 determines if the web speed calculated at step 260 is less than or equal to the desired web conveyance speed loaded at step 252. If so, the global dryer control system 216 configures the transport control 220 to set the web speed for the production run to the desired web conveyance speed, at step 264. Otherwise, at step 266, the global dryer control system 216 configures the transport control 220 to set the web speed for the production run to the necessary web speed calculated at step 260.

At step 270, the global dryer control system 216 configures the closed-loop dryer controller 202 of each dryer unit 32, 46, 64, 80, and 84 in accordance the minimum and maximum web temperatures determined at steps 258 and 256, respectively.

At step 272, the global dryer control system 216 determines a location along the width of the web 24 that is to receive the maximum material volume per area calculated in step 254. In some embodiments, the global dryer control system 216 operates a camera 212 positioning apparatus (not shown) to automatically position the camera 212 so that the camera 212 is able to capture such determined location. In other embodiments, the global dryer control system 216 informs an operator to manually position the camera 212 so the camera 212 can capture the determined location. Thereafter, the global dryer control system 216 exits.

Referring once again to FIG. 3, after the closed-loop dryer controller 202 and the transport control 220 have been configured by the global dryer control system 216, and the production run started, each closed-loop dryer controller 202 operates the heating unit(s) 206 associated therewith to maintain the temperature of the web 24 between the minimum and maximum temperatures. In addition, the closed-loop dryer controller 202 detects if the material deposited on the web 24 is not being dried sufficiently and, for example, pick off is occurring and, in response, adjusts the heating unit(s) 206 associated therewith and/or the transport control 220 accordingly.

Figure 5:
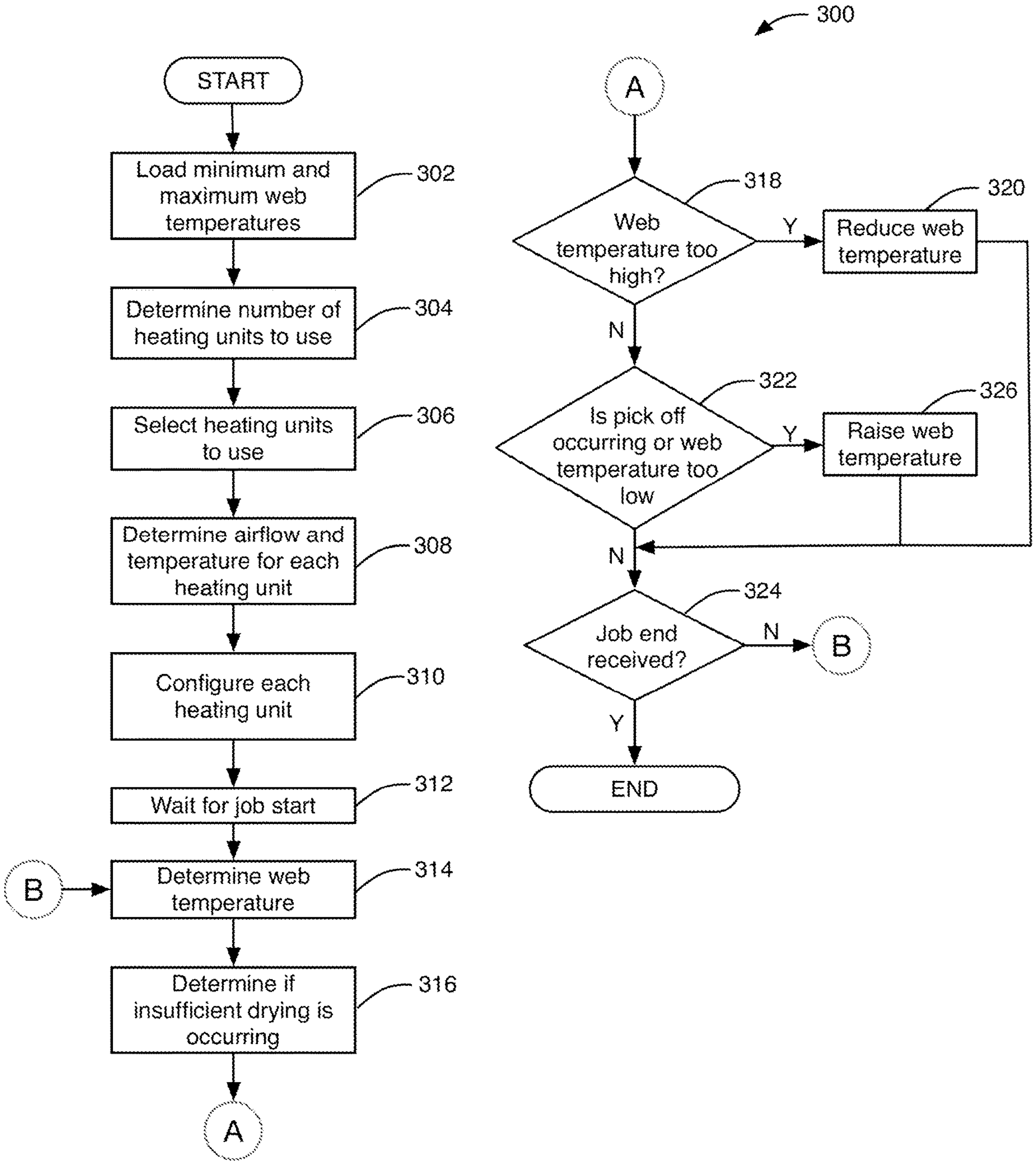
FIG. 5 is a flowchart of steps undertaken by a closed-loop dryer controller to control the dryer unit of FIG. 3.

FIG. 5 shows a flowchart 300 of the steps undertaken by the closed-loop dryer controller 202 to maintain the temperature of the web 24 and to detect and prevent insufficient drying. Referring to FIG. 5, at step 302, the closed-loop dryer controller 202 loads the minimum and maximum temperature information determined by the global dryer control system 216 at steps 256 and 258 (FIG. 4).

At step 304, the closed-loop dryer controller 202 selects which ones of the heating unit(s) 206*a*-206*n* available in the drying unit 32, 46, 64, 80, or 84 will be operated to maintain the temperature of the web 24 at least at the minimum temperature during the production run. In some embodiments, the dryer unit 32, 46, 64, 80, 84 may be configured with only one heater unit 206. In other embodiments, the dryer unit 32, 46, 64, 80, 84 may be configured with as many as 18 (or more) heater units 206 and only a subset of such heater units may be used during the production run. In situations, where heavy material coverage is expected or a slow drying material is deposited on the web 24, all of the available heater units 206 may be used. In some embodiments, all of the heater units 206 may be used when the production run is started and the number of heater units 206 may be adjusted during the production run in response to monitoring of the temperature of the web 24.

At step 308, the closed-loop dryer controller 202 determines a temperature and a speed of the flow of heated air generated by each selected heater unit 206 during the production run. For example, a first one of the selected heater units (e.g., heater unit 206*a*) that the web 24 passes after having been printed on may be configured to direct the flow of heated air toward the face 214 of the web 24 at a lower speed and higher temperature than a subsequent heater unit 206. It should be apparent to one of ordinary skill the art that the material deposited on the web 24 is relatively fluid when the web 24 reaches the first heater unit 206*a* and that directing the flow of heated air at a high speed may disturb such material. As the material dries, the flow of heated air may be directed at the web at higher speeds without disturbing the material.

In some embodiments, the closed-loop dryer controller 202 sets the speed of the heated air generated by the first heater unit 206*a* to be between about 0.1 and about 0.2 cubic feet per minute per linear inch of the width of the web 24. Such air flow speed may be incrementally increased at one or more subsequent heater units 206*b* through 206*n* until the speed of the heated air generated by the heater unit 206 that is operated and is most distal from the imager unit 30, 44, 60, 70, or 82 is approximately 2 cubic per minute per linear inch of a width the web 24.

Further, it should be apparent to one who has ordinary skill in the art, that evaporation of solvent in the material as the web 24 passes past the heater units 206 facilitates cooling of the web 24. Thus, the flow of heated air generated by the first heater unit 206*a* toward the web 24 may have a higher temperature because the solvent content of the material exposed to such flow of heated air is highest relative to when the material is exposed to air from subsequent heater unit(s) 206*b*-206*n*.

In some embodiments, the flow of heated air generated by the first heater unit 206*a* exceeds the temperature at which the web 24 begins to shrink (i.e., a shrink temperature). For example, if the shrink temperature of the web is 130° F. (about 54° C.), the temperature of the flow of heated air generated by the first heater unit 206*a* may be set to about 190° F. (about 88° C.). Further, the temperature of the airflow generated by subsequent heater unit(s) 206*b*-206*n* may ramp downward so that the airflow generated by the heater unit 206 most distal from the imager unit 30, 44, 60, 70, or 82 is near the shrink temperature of the web (or less).

At step 310, the closed-loop dryer controller 202 configures each heater unit 206 selected at step 306 to generate the flow of heated air in accordance with the speed and temperature determined at step 308 for that heater unit 206.

At step 312, the closed-loop dryer controller 202 waits to receive a job start signal, for example, from the supervisory control system 120 (FIG. 1), that indicates that the production run is to begin. Also at step 312, the closed-loop dryer controller 202 directs the heater unit(s) 206 selected at step 306 to begin generating the flow of heated air.

At step 314, the closed-loop dryer controller 202 polls the temperature sensing devices 208 associated with the heater units 206 being used for the production run to acquire a temperature of the web 24 sensed by each temperature sensing device 208.

At step 316, the closed-loop dryer controller 202 determines whether insufficient drying of the material may be occurring, as described in greater detail below.

At step 318, the closed-loop dryer controller 202 determines if the web temperature sensed by any of the temperature sensing devices polled at step 315 exceeds the maximum web temperature loaded at step 302 and, if so, proceeds to step 320. Otherwise, the closed-loop dryer controller 202 proceeds to step 322.

At step 320, the closed-loop dryer controller 202 adjusts operation of the heater unit(s) 206 to facilitate reducing the temperature of the web 24 and then proceeds to step 324.

At step 322, the closed-loop dryer controller 202 checks if the temperature of the web 24 determined at step 314 is too low for the material deposited thereon to dry or if insufficient drying of the material was determined at step 316 and, if so, the closed-loop dryer controller 202 proceeds to step 324. Otherwise, the closed-loop dryer controller 202 proceeds to step 326. In particular, the closed-loop dryer controller 202 analyzes the temperatures of the web 24 sensed by all of the temperature sensing device 208 and if none of the sensed temperatures of the web 24 exceed the minimum web temperature, the closed-loop dryer controller 202 determines that web temperature is too low.

At step 324, the closed-loop dryer controller 202 adjusts operation of the heater unit(s) 206 to facilitate raising the temperature of the web 24, and then proceeds to step 326.

At step 326, the closed-loop dryer controller 202 determines if a job send signal has been received from the supervisory control system 120. If such signal has not been received, the closed-loop dryer controller 202 returns to step 314. Otherwise, the closed-loop dryer controller 202 initiates a shutdown process for the heater units 206 and exits.

Figure 6:
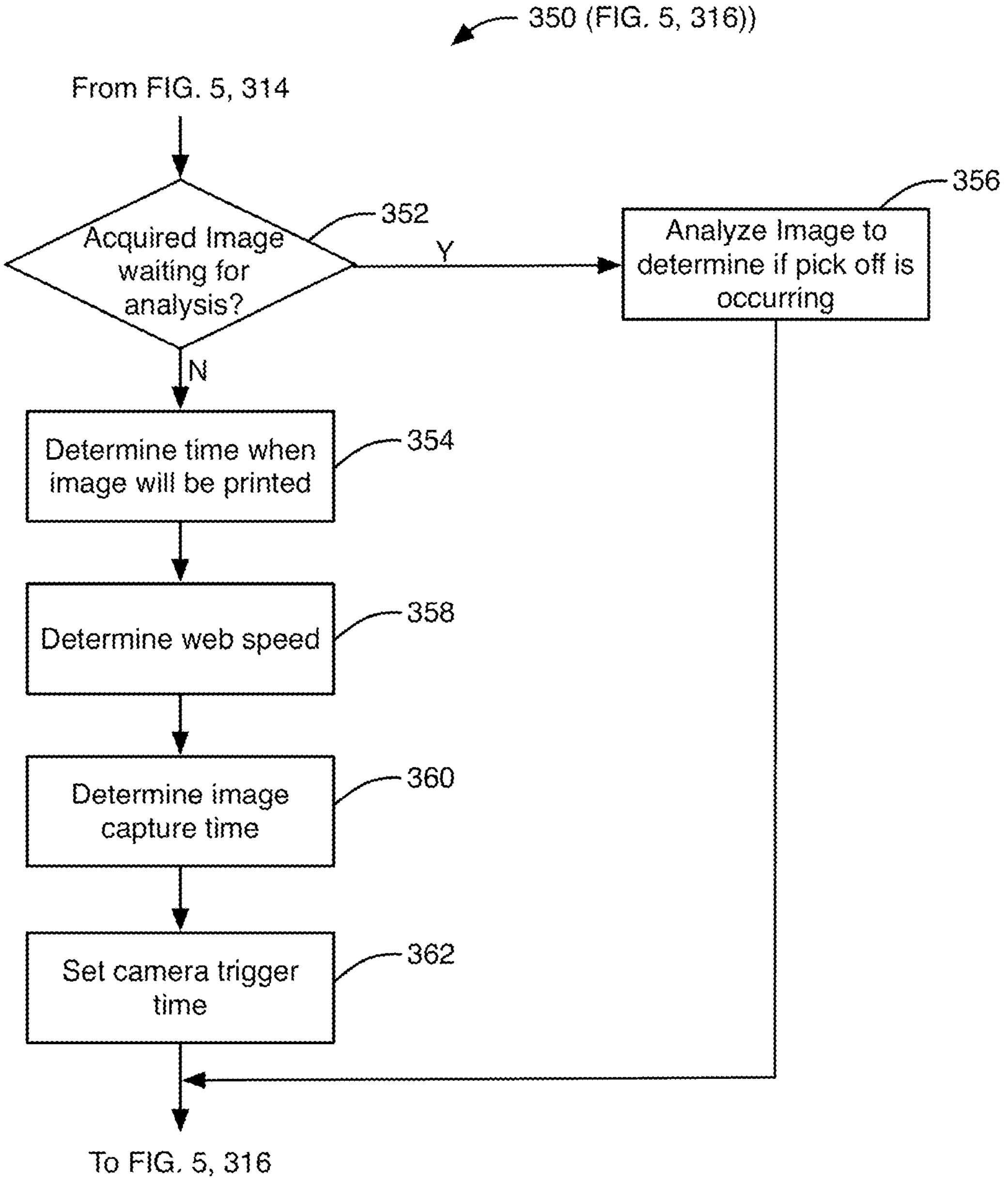
FIG. 6 is a flowchart of steps undertaken by the closed-loop dryer controller to determine if drying of material is insufficient.

FIG. 6 shows a flowchart 350 of steps undertaken at step 316 (FIG. 5) by the closed-loop dryer controller 202 to determine if the material on the web 24 is insufficiently dried. Referring to FIGS. 3 and 6, as described above, insufficient drying of the web may be detected when the material deposited on the side 214 of the web 24 contacts a roller, e.g. roller 210, before such material is fully dried. A portion of the undried material is transferred to the roller 210, and then from the roller 210 to a subsequent portion of the side 214 of the web 24.

Referring to FIG. 6, at step 352, the closed-loop dryer controller 202 determines if the camera 212 has acquired an image of the web 24 is available for analysis. If no such image has been acquired, the closed-loop dryer controller 202 proceeds to step 354, otherwise the closed-loop dryer controller 202 proceeds to step 356.

At step 354, the closed-loop dryer controller 202 analyzes the content that is to be printed to determine a first time in the future when an image will be printed by the imager unit 30, 44, 62, 68 on a first portion of the web 24 and that will in the field of view of the camera 212. At step 358, the closed-loop dryer controller 202 uses the frequency of the signals generated by the encoder roller 204 (FIG. 3) and a predefined circumference of the encoder roller 204 to determine the speed of the web 24.

At step 360, the closed-loop dryer controller 202 determines in accordance with the first time and the web speed, a second time when a second portion of the web 24 immediately following the first portion of the web 24 and that is supposed to be free of material will be in the field of view of the camera 212.

At step 362, the closed-loop dryer controller 202 set a trigger to cause the camera 212 to acquire an image of the second portion of the web 24 at the second time and store such image in a memory location accessible by closed-loop dryer controller 202 and the camera 212. In one embodiment, at step 362, the closed-loop dryer controller 202 sets a timer that causes an interrupt to be generated at the second time. In addition, the closed-loop dryer controller 202 associates an image capture process to be initiated when such interrupt is generated. Such image capture process directs the camera 212 to acquire the image, receives the acquired image, and stores the acquired image in the shared memory. Other ways of triggering the camera 212 to capture an image at particular time apparent to one who has ordinary skill in the art may be used.

After the trigger has been set at step 362, the closed-loop dryer controller 202 proceeds to step 316 of FIG. 5.

If, at step 352, the closed-loop dryer controller 202 determines that an image is available for analysis (i.e., an image acquired in response to the trigger set at step 362 being actuated), the closed-loop dryer controller 202, at step 356, analyzes the acquired image. As described above, the captured image is of the second portion of the web 24 that is expected to be free of any material. The closed-loop dryer controller 202 analyzes the captured image to determine if any pixels thereof have a value that indicates that material has been transferred to the second portion of the web 24. For example, the closed-loop dryer controller 202 may apply a threshold operation to the acquired image that selects pixels having intensity values greater than a predetermined intensity value. If at least a predetermined number of pixels are selected as a result of such threshold operation, then the closed-loop dryer controller 202 determines that material transfer from the roller 210 to the second portion has occurred. Otherwise, the closed-loop dryer controller 202 determines that no such material transfer has occurred. It should be apparent that other ways of analyzing the captured image to determine whether material transfer has occurred apparent to one who has ordinary skill in the art may be used. After undertaking step 356, the closed-loop dryer controller 202 proceeds to step 316 of FIG. 5.

Figure 7:
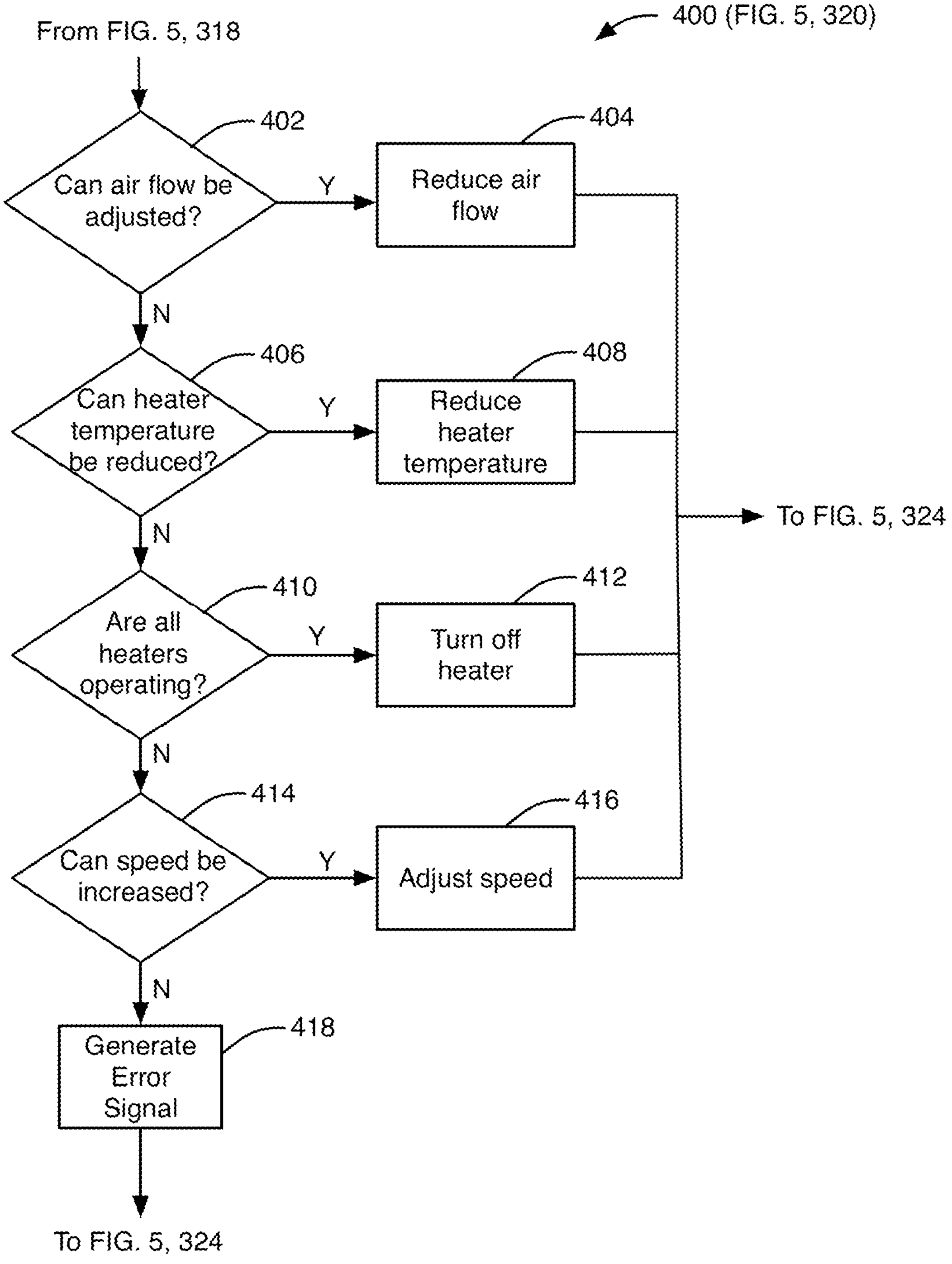
FIG. 7 is a flowchart of steps undertaken by the closed-loop dryer controller to reduce a temperature of a web printed on by the system of FIG. 1.

FIG. 7 is a flowchart 400 of the steps undertaken by the closed-loop dryer controller 202 to reduce the temperature of the web 24. Referring to FIG. 7, the closed-loop dryer controller 202, determines, at step 402, if the speed of the flow of heated air can be adjusted to reduce the temperature of the web 24. If so, then at step 404, the closed-loop dryer controller 202 directs the one or more of the heater units 206*a*-206*n* to reduce the speed of the flow of heated air of generated thereby, and thus reduce the convection of heat from the such heater units 206 to the web 24. After undertaking step 404, the closed-loop dryer controller 202 proceeds to step 324 (FIG. 5).

If at step 402, the closed-loop dryer controller 202 determines that the speed of the flow of heated air cannot be adjusted, then, at step 406, the closed-loop dryer controller 202 determines if the temperature of the heated air generated by one or more heater unit(s) 206*a*-206*n* can be reduced. For example, if the all of the heater unit(s) 206*a*-206*n* are operating at their minimum operating temperature, then such temperature cannot be reduced.

If the temperature of the flow of heated air can be reduced, then at step 408, the closed-loop dryer controller 202 selects a heater unit 206 and directs such heater unit 206 to generate the flow of heated air at a lower temperature. In one embodiment, the closed-loop dryer controller 202 selects the heater unit 206 operating at the highest temperature and reduces the temperature of such heater unit 206 by a predetermined amount (e.g., 5° F.) or by a percentage of the current setting of the temperature of the flow of heated air (e.g., 10%). In other embodiments, the closed-loop dryer controller 202 selects and reduces the temperature of the flow of heated air generated by the heater unit 206 most distal to the imager unit 30, 44, 62, or 68. After undertaking step 408, the closed-loop dryer controller 202 proceeds to step 324 (FIG. 5). It should be that other ways to select the heater unit 206 to adjust in this manner and/or amount of such adjustment apparent to one who has ordinary skill in the art may be used.

If at step 406, the closed-loop dryer controller 202 determines that the temperature of one of the heater unit(s) 206*a*-206*n* cannot be reduced, the closed-loop dryer controller 202 determines, at step 410, if more than one heater unit 206*a*-206*n* is operating and, if so, whether one such heater unit 206 can be turned off. If so, then at step 412, the closed-loop dryer controller 202 turns off the heater unit 206 most distal, most proximal, or intermediate the most distal and most proximal from the imager unit 30, 44, 62, or 68. After undertaking step 412, the closed-loop dryer controller 202 proceeds to step 324 (FIG. 5). In an exemplary embodiment the closed-loop dryer controller 202 turns off the heater unit 206 that is operating and is most distal from the image unit 30, 44, 62, or 68.

If at step 410, the closed-loop dryer controller 202 determines that one of the heater unit(s) 206*a*-206*n* cannot be turned off, the closed-loop dryer controller 202, at step 414 determines if the conveyance speed of the web 24 can be increased (e.g., if the web 24 is not being conveyed at maximum speed) to reduce the heater dwell time of the web 24. If so, the closed-loop dryer controller 202 directs the transport control 220 to increase the web speed, at step 416. After undertaking step 416, the closed-loop dryer controller 202 proceeds to step 324 (FIG. 5).

If at step 414, the closed-loop dryer controller 202 determines that the web speed cannot be increased, then, in some embodiments, the closed-loop dryer controller 202, at step 418, generates an error signal to, for example, the supervisory control system 120 that the temperature of the web 24 cannot be reduced and an operator should be alerted and/or a shutdown procedure started. Thereafter, the closed-loop dryer controller 202 proceeds to step 324 (FIG. 5).

Figure 8:
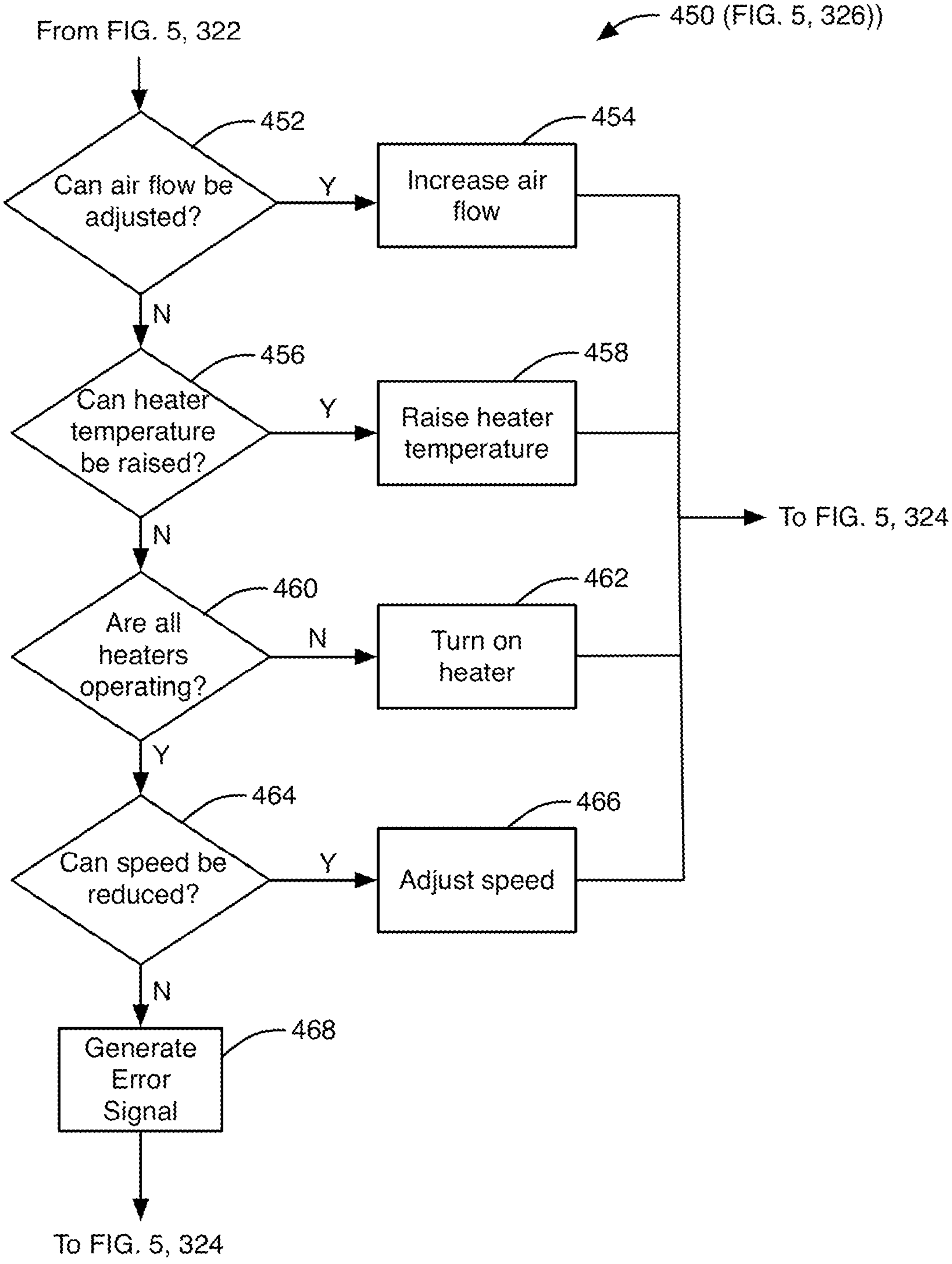
FIG. 8 is a flowchart of steps undertaken by the closed-loop dryer controller to raise a temperature of a web printed on by the system of FIG. 1.

FIG. 8 is a flowchart 450 of the steps undertaken by the closed-loop dryer controller 202 to raise the temperature of the web 24. Referring to FIG. 8, the closed-loop dryer controller 202, at step 452, determines if the speed of the flow of heated air can be adjusted to raise the temperature of the web 24. If so, then at step 454, the closed-loop dryer controller 202 increases the speed of the flow of heated air of one or more of the heater unit(s) 206*a*-206*n* to increase the convection of heat from the such heater unit(s) 206. After undertaking step 454, the closed-loop dryer controller 202 proceeds to step 324 (FIG. 5).

Otherwise, at step 456, the closed-loop dryer controller 202 determines if the temperature of the flow of heated air generated by one or more heater units 206*a*-206*n* can be increased. For example, if the all of the heater unit(s) 206*a*-206*n* are operating at their maximum operating temperature, then such temperature cannot be increased.

If the temperature of the flow of heated air can be increased, then at step 458, the closed-loop dryer controller 202 selects a heater unit 206 and directs such heater unit 206 to generate the flow of heated air at a higher temperature. In one embodiment, the closed-loop dryer controller 202 selects the heater unit 206 operating at the lowest temperature and increases the temperature of such heater unit 206 by a predetermined amount (e.g., 5° F.) or by a percentage of the current setting of the temperature of the flow of heated air (e.g., 10%). In other embodiments, the closed-loop dryer controller 202 selects and increases the temperature of the flow of heated air generated by the heater unit 206 most proximal to the imager unit 30, 44, 62, or 68. After undertaking step 454, the closed-loop dryer controller 202 proceeds to step 324 (FIG. 5). Other ways to select a heater unit 206 to adjust in this manner and/or amount of such adjustment apparent to one who has ordinary skill in the art may be used.

If at step 456, the closed-loop dryer controller 202 determines that the temperature of the flow of air generated by any of the heater unit(s) 206*a*-206*n* cannot be raised to increase the temperature of the web 24, the closed-loop dryer controller 202 determines, at step 460 if all of the heater units 206*a*-206*n* are operating or if an additional heater unit 206 can be turned on. If an additional heater unit 206 can be turned on, then at step 462, the closed-loop dryer controller 202 turns on an additional heater unit 206. After undertaking step 462, the closed-loop dryer controller 202 proceeds to step 324 (FIG. 5). In some embodiments, the closed-loop dryer controller 202 turns on the heater unit 206 that is not operating and that is most distal, most proximate, or intermediate from the imager unit 30, 44, 62, or 68. In an exemplary embodiment, the closed-loop dryer controller 202 turns on the heater unit 206 that is not operating and that is most proximate the imager unit 30, 44, 62, or 68.

If at step 460, if the closed-loop dryer controller 202 determines that all of the heater units 206*a*-206*n* are operating, the closed-loop dryer controller 202, at step 464 determines if the conveyance speed of the web 24 can be decreased to increase the heater dwell time of the web 24. If so, the closed-loop dryer controller 202 directs the transport control 220 to reduce the web speed, at step 466. After undertaking step 466, the closed-loop dryer controller 202 proceeds to step 324 (FIG. 5).

If, at step 464, the closed-loop dryer controller 202 determines that the web speed cannot be reduced, then, in some embodiments, the closed-loop dryer controller 202, at step 468, generates an error signal to, for example, the supervisory control system 120 that the temperature of the web 24 cannot be increased and an operator should be alerted and/or a shutdown procedure started. Thereafter, the closed-loop dryer controller 202 proceeds to step 324 (FIG. 5).

Referring once again to FIG. 3, in some embodiments each heater unit 206 is coupled by a corresponding air duct to a turbo-blower unit 482. The turbo-blower unit 482 supplies a flow of unheated air to all of the heater unit(s) 206*a*-206*n*, which in turn heat such flow of unheated air and to create the flow of heated air directed toward the web 24. In some embodiments, the closed-loop dryer controller 202 adjusts the speed of the flow of unheated air generated by turbo-blower unit 482 to increase or decrease the speed of the flow of heated air generated by all of the heater unit(s) 206*a*-206*n*. In addition, the closed-loop dryer controller 202 may individually adjust a heater unit 206 to increase or decrease the speed of the flow of heated air generated thereby independently of the other heater units 206.

Figure 9A:
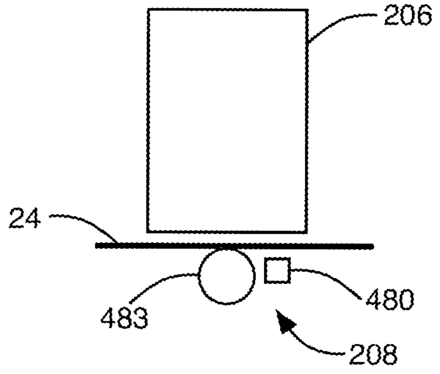
FIGS. 9A and 9B are a simplified block diagram showing a temperature sensing device of the dryer unit of FIG. 3.
Figure 9B:
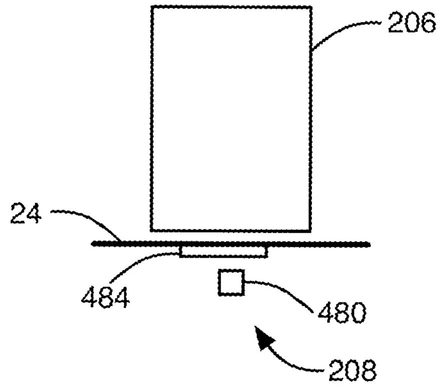

In some embodiments, the temperature sensing device 208 may be a temperature sensor that directly senses the temperature of the web 24 to develop an indication of the temperature of the web 24. However, in some cases it may not always be feasible to directly sense the temperature of the web 24. For example, a contact temperature sensor may interfere with conveyance of the web 24. However, a contactless temperature sensor, e.g., an infrared temperature sensor, may not accurately sense the temperature of the web 24 because, for example, the web 24 has portions that are clear or has material disposed thereon that is of varying colors and/or comprises one or more metallic component(s). FIGS. 9A and 9B illustrate two embodiments of temperature sensing devices 208 that use a contact less temperature sensor 480 to develop an indication of the temperature of the web 24.

Referring to FIG. 9A, the temperature sensing device 208 includes a heat-conductive roller 483, such as an idler roller, disposed opposite the heater unit 206 and the web rides on such heat-conductive roller 483. The heat-conductive roller 483 is heated by the web 24 and the temperature sensor 480 monitors the temperature of the heat-conductive roller 483 to develop an indication of the temperature of the web 24.

Alternately, referring to FIG. 9B, instead of the roller 483, the temperature sensing device 208 includes a heat-conductive plate 484 disposed opposite the heater unit 206 and the web 24 is conveyed past such plate 484. The heat-conductive plate 484 is heated by the web 24 and the temperature sensor 480 monitors the temperature of the heat-conductive plate 484 to develop an indication of the temperature of the web 24. It should be apparent that in such embodiments, the temperature sensor 480 may be a contact less sensor or may be a contact sensor attached to the plate 484.

Other configurations and ways of operating the temperature sensing device 208 to develop an indication of the temperature of the web 24 apparent to those who have ordinary skill in the art may be used.

In some embodiments, additional sensors may be disposed in or proximate the dryer unit 32, 46, 64, 80, or 84 to sense the ambient conditions proximate thereto. For example, a humidity sensor (not shown) may be disposed proximate the dryer unit 32, 46, 64, 80, or 84 to sense the humidity proximate thereto and the global dryer control system 216 and/or the closed-loop dryer controller 202 may use information from such additional sensors to adjust the speed and/or temperature of the airflow generated by the heater unit(s) 206.

Referring to FIG. 3, the dryer unit 32, 46, 64, 80, or 84 may include additional components including for example one or more roller(s) (e.g., roller 490) or other components (not shown) to guide and/or support the web 24 as it is conveyed through such dryer unit.

In some embodiments, the global dryer control system 216 may receive information from the closed-loop dryer controller 202 regarding whether the initial necessary web speed and minimum temperature developed at the start of a particular production run did not result in material deposited on the web 24 being sufficiently dried. The global dryer control system 216 may adjust the information in the global data system 218 that a slower web speed and/or higher temperature should be used for other production runs that have characteristics similar to the particular production run.

In some embodiments, the global dryer control system 216 may monitor the content that is going to printed by the imager unit 30, 44, 60, 70, or 82 during a production run. If the global dryer control system 216 determines that the characteristics of such content will result in a substantially more or less volume of the material being deposited on the web 24, the global dryer control system 216 may develop an updated necessary web speed and/or minimum temperature the web 24 should reach and reconfigure the closed-loop dryer system in accordance with such updated web speed and temperature.

It should be apparent to those who have skill in the art that any combination of hardware and/or software may be used to implement the supervisory system 120, the closed-loop dryer controller 202, the global dryer control system 216, the data system 218, and the transport control 220. described herein. It will be understood and appreciated that one or more of the processes, sub-processes, and process steps described in connection with FIGS. 1 and 3-8 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1 and 3-8. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the supervisory system 120, the closed-loop dryer controller 202, the global dryer control system 216, the data system 218, and the transport control 220), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

In summary, a dryer management system 217 is disclosed herein that operates on or more dryer unit(s) 32, 46, 64, 80, and/or 84 to dry material disposed on a web. It should be apparent to one who has ordinary skill in the art that the embodiments of the dryer management system 217 disclosed herein may be adapted to dry any type of material deposited on any type of substrate using heat and/or a flow of heated air. Further, it should be apparent such embodiments may be adapted to dry material deposited on a substrate using any type of material deposition process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure. This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dryer management system to manage drying a material deposited on a web, comprising:

a web transport adapted to convey the web;

a dryer unit associated with and disposed downstream of an imager unit having at least one heater unit adapted to generate a flow of heated air to heat the web;

a temperature sensing device disposed proximate the web to develop an indication of a temperature of the web as the web is convey past the heater unit; and a closed-loop dryer controller that monitors the indication of the temperature developed by the temperature sensing device and sufficiency of drying of material deposited on the web and adjusts operation of the heater unit to sufficiently dry the material deposited on the web and maintain the indication of the temperature developed by the temperature sensing device below a maximum temperature; and a camera disposed downstream of the dryer unit, wherein the closed-loop dryer controller receives an image of the web from the camera, analyzes the received image to detect insufficient drying of the material deposited on the web, and in response adjusts operation of the heater unit.

2. The dryer management system of claim 1, wherein the dryer unit comprises a further heater unit to generate a further flow of heated air, wherein the closed-loop dryer controller sets a first speed of the flow of heated air generated by the heater unit and a second speed of the further flow of heated air generated by the further heater unit, wherein the first speed is less than the second speed, wherein the heater unit and the further heater unit comprise first and second heaters and the first and second heaters are both supplied with flows of unheated air generated by a blower.

3. The dryer management system of claim 2, wherein the closed-loop dryer controller sets a first temperature of the flow of heated air generated by the heater unit and a second temperature of the flow of heated air generated by the further heater unit, wherein the first temperature is greater than the second temperature.

4. The dryer management system of claim 3, wherein the first temperature is at least about 88° C. and the second temperature is less than about 55° C.

5. The dryer management of claim 3, wherein the first temperature is greater than a shrink temperature of the web.

6. The dryer management system of claim 5, wherein the first temperature is at least 34° C. greater than the shrink temperature of the web.

7. The dryer management system of claim 1, further comprising a conductive material proximate the web, wherein the temperature sensing device includes a temperature sensor that senses a temperature of the conductive material to develop the indication of the temperature of the web.

8. The dryer management system of claim 1, wherein the temperature sensing device directly senses a temperature of the web to develop the indication of the temperature of the web.

9. The dryer management system of claim 1, wherein the web comprises a shrinkable polymeric film.

10. The dryer management system of claim 1, wherein the web comprises a tube.

11. The dryer management system of claim 1, further including a global dryer control system, wherein the global dryer control system analyzes information regarding a production run and determines the maximum temperature and a speed at which to convey the web.

12. The dryer management system of claim 11, wherein the speed at least 200, 300, 400, or 500 feet-per-minute.

13. The dryer management system of claim 11, wherein the dryer unit, the temperature sensing device, and the closed-loop dryer controller are associated with a first imager unit and comprise a first dryer unit, a first temperature sensing device, and a first closed-loop dryer controller, respectively, and the dryer management system includes a second dryer unit, a second temperature sensing device, and a second closed-loop dryer controller associated with a second imager unit, and the global dryer control system determines the speed and the maximum temperature in accordance with the material that is deposited by the first imager unit and the second imager unit.

14. The dryer management system of claim 11, wherein the speed comprises a first speed and the global dryer control system configures the web transport to convey the web at the first speed and the closed-loop dryer controller reconfigures the web transport to convey the web at a second speed different than the first speed.

15. The dryer management system of claim 1, wherein the dryer unit includes a plurality of heater units and the closed-loop dryer controller selects a first subset of the plurality of heater units to operate during a production run.

16. The dryer management system of claim 1, wherein the maximum temperature is at least 52° C.

17. The dryer management system of claim 1, further including a humidity sensor that senses the humidity proximate the web.

18. The dryer management system of claim 1, wherein the at least one heater unit is operated to generate the flow of heated air at between about 0.1 cubic-feet-minute per linear inch of a width of the web and about 2 cubic-feet per minute per linear inch of the width of the web.

19. A method of managing drying of a material deposited on a web, comprising the steps of:

conveying the web having undried material deposited thereon;

generating a flow of heated air to heat the web;

developing an indication of a temperature of the web; and monitoring the indication of the temperature and an image of the web from a camera to monitor the sufficiency of drying of material deposited on the web, in response, adjusting at least one of a temperature of the heated air and a speed of the heated air to maintain the indication of the temperature of the web below a maximum temperature.

* * * * *